Sept. 12, 1961     J. P. CASSERLY     2,999,893

STORAGE BATTERY CONSTRUCTION

Filed June 16, 1958

*INVENTOR.*
JOHN P. CASSERLY
BY
*ATTORNEY*

United States Patent Office 2,999,893
Patented Sept. 12, 1961

2,999,893
STORAGE BATTERY CONSTRUCTION
John P. Casserly, Cleveland Heights, Ohio, assignor to The Electric Storage Battery Company, a corporation of New Jersey
Filed June 16, 1958, Ser. No. 742,148
1 Claim. (Cl. 136—166)

This invention relates to improvement in storage batteries. More specifically, the present invention is concerned with storage batteries having a plurality of interconnected cells.

A specific object of the present invention is to provide means in a storage battery construction to prevent the interconnection of one or more of the cells in reverse.

The interconnection of two or more of the cells of a battery in reverse will result in the loss to the battery of the potential available from the cells involved. Still further, it is a costly and time consuming process to dismantle and reassemble batteries with improperly connected cells. Accordingly, it is another object of the present invention to provide in a battery construction a means which will prevent the completion of a battery with one or more of the cells connected in reverse.

A further object of the present invention is to facilitate the manufacturing of storage batteries by providing means which will make readily apparent the improper insertion of a cell element.

These and other objects of the present invention are accomplished by providing a rib on the wall of each cell compartment and an extension on each plate connection strap of one polarity. The rib is so placed with relation to the other cell compartments that if a plate assembly is inserted into the cell compartment in reverse with respect to the desired cell groupnig, that is, the plan for interconnecting the cells of the battery, the extension on the strap will catch on the rib and the assembly will not properly seat in the compartment. In this manner, the interconnection of the cells is prevented until the improperly inserted plate assembly is withdrawn from the compartments and reinserted in proper orientation.

A better understanding of the present invention may be had from the following description when read with reference to the accompanying drawing of which:

Figure 1:
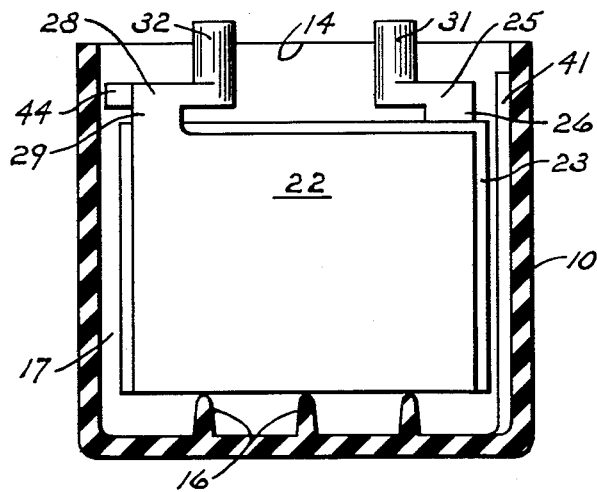
FIG. 1 is a sectional elevation of an embodiment of the present invention in which the cell assembly is properly inserted into the container.

Referring now to the drawing, the numeral 10 designates a battery casing for a three cell automotive type battery which is divided into cell compartments 11, 12, and 13 by the vertical partitions 14 and 15. As shown in FIG. 1, each of the cell compartments has a plurality of ribs 16 which extend upwardly from the bottom of the casing 10 to support the cell elements. The cell compartments 11, 12, and 13 are adapted to receive the cell element assemblies 17, 18, and 19 respectively. The cell element 17 is made up of a group of positive plates 21 and negative plates 22 which are interleaved with separators 23 placed between each positive and negative plate. The positive plates 21 are connected together by burning lead straps 25 to the plate lugs 26. Similarly, each of the negative plates 22 are connected together by burning lead straps 28 to the plate lugs 29. The straps 25 and 28 carry terminal posts 31 and 32 respectively for making electrical connections thereto.

The cell elements 18 and 19 are constructed in the same manner as the element 17. Thus, the element 18 has a positive strap 33 carrying a terminal post 34 and a negative strap 35 carrying a terminal post 36. Similarly, the element 19 has a positive strap 37 carrying a terminal post 38 and a negative strap 39 carrying a terminal post 40.

In the assembly of a battery, after each of the cell elements have been assembled and been placed in the appropriate cell compartments, hard rubber covers are placed over each cell to prevent acid from spilling and to keep out dirt and foreign substances. The cells are then connected together electrically by burning intercell connectors to adjoining positive and negative posts of adjoining elements. To this end, the positive and negative posts of adjoining cells are oriented adjacent to each other in the battery casing.

Figure 2:
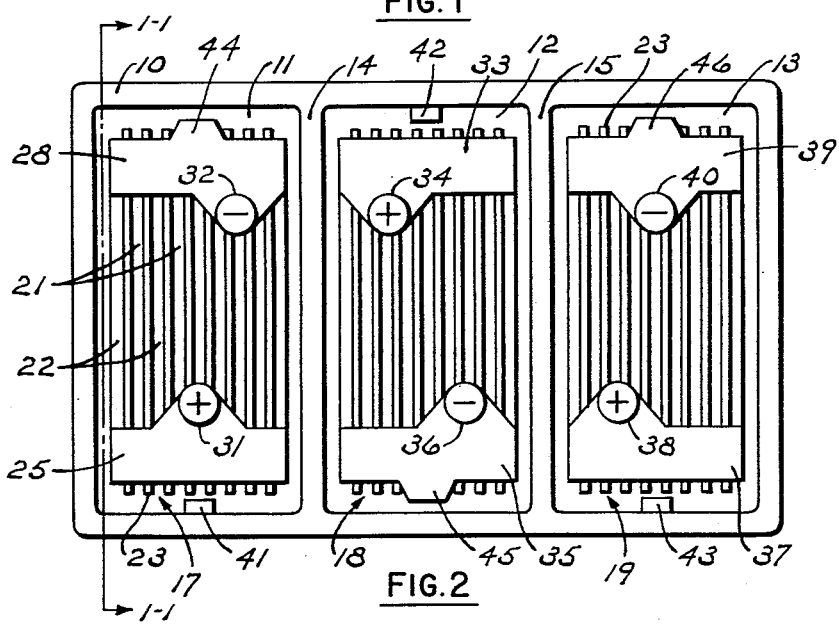
FIG. 2 is a top view of the battery shown in FIG. 1.
Figure 3:
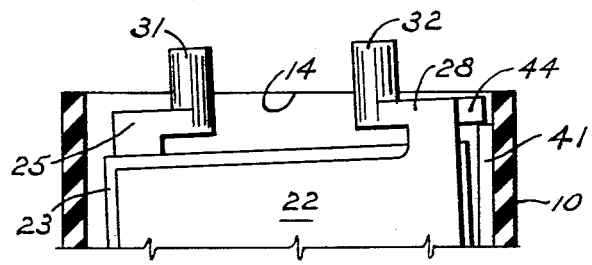
FIG. 3 is a partial sectional elevation of the battery shown in FIGS. 1 and 2 with cell element improperly inserted in the casing.

In the battery shown in FIGS. 1 through 3, the cell elements 17, 18, and 19 are adapted to be connected in series and thus, the negative terminal post 32 of the element 17 is adapted to be connected to the positive terminal post 34 of the element 18 and the positive terminal post 36 of the element 18 is adapted to be connected to the negative terminal post 41 of the element 19. To this end, the elements 17, 18, and 19 are oriented in their respective compartments so that the terminal post 32 of the element 17 is adjacent to the terminal post 34 of the element 18 and the element 19 is oriented in its compartment so that the terminal post 38 is adjacent to the terminal post 36 of the element 18.

From the foregoing, it can be seen that if one of the cell elements of the battery shown in the drawings is placed in its compartment in improper orientation with respect to the desired grouping of the cells of the battery, the terminal posts of that cell will be adjacent to the terminal posts of the same in the adjoining cell or cells. For example, if the cell element 18 were improperly inserted into the compartment 12, the negative terminal post 36 would be adjacent to the negative terminal post 32 of the cell element 17 and the positive terminal post 34 would be adjacent to the positive terminal post 38 of the cell element 19. If the elements 17, 18, and 19 were interconnected while the element 18 was in improper orientation, the desired battery voltage would either not be achieved or the battery would operate below its intended efficiency.

In order to prevent the interconnection of improperly connected cells, the extensions 44, 45, and 46 have been provided on the negative straps 28, 35, and 39 respectively. The extensions 44, 45, and 46 extend outward beyond the separators and plates of the cell elements from their respective straps toward the wall of the battery casing 10. In addition to the extensions 44, 45, and 46, the ribs 41, 42, and 43 have been provided on the side walls of the cell compartments 17, 18, and 19 respectively. The ribs 41, 42, and 43 extend upward from the bottom of the casing 10 to a height above the battery straps and are located in their respective cell compartments so as to be adjacent the positive straps of the respective cell elements in accordance with the grouping of the cells of the battery. The ribs 41, 42, and 43 extend into the cell compartments only a short distance and in no way interfere with the insertion of a cell element in proper orientation. If, as shown in FIG. 3, a cell is inserted into its compartment in reverse to its proper orientation, the extension on the negative strap will strike the top of the rib and prevent the cell element from being properly seated in the compartment. In this manner, the improper insertion of a cell can be readily detected. In addition, it is also impossible to either place a cover over the cell or utilize a preformed intercell connector.

As will be apparent to those skilled in the art, certain modifications can be made in the invention without departing from the spirit of the invention. For example, extensions may be added elsewhere on the straps or on other parts of the elements and the ribs may project outward from the wall of the battery casing without running from the bottom thereof. In addition, while the invention has been illustrated in connection with an automotive type battery having three cells connected in series, it is apparent that it is adapted for use in other types of batteries having any number of cells connected either in series, in parallel or according to some other grouping.

Having now described the invention, that which is claimed is:

In combination, a storage battery casing having a plurality of cell compartments each adapted to receive a cell element comprising a group of positive plates connected together by means of a strap carrying a terminal post and a group of negative plates connected together by means of a strap carrying a terminal post, said cell elements being adapted to be oriented in their respective cell compartments in accordance with a predetermined grouping of the cells of the battery, a rib in each of said compartments, each of said ribs being on the wall of its respective compartments which, according to said grouping, is to be adjacent the terminal post of the same polarity on each of the respective cell elements, and an extension on the strap connecting together the plates of the opposite polarity on each of said cell elements, each of said ribs extending above the normal seating height of said extensions when said cell elements are properly oriented with respect to said cell grouping in their respective cell compartments, said extension being adapted to strike the rib on the wall of the cell compartment if the cell element is not inserted into the compartment in accordance with said cell grouping and thus prevent said cell element from properly seating in the cell compartment.

References Cited in the file of this patent

UNITED STATES PATENTS

| | | |
|---|---|---|
| 1,354,256 | Ivey et al. | Sept. 28, 1920 |
| 1,860,663 | Dunzweiler | May 31, 1932 |
| 2,397,469 | Casanov | Apr. 2, 1946 |
| 2,478,887 | Nelson | Aug. 9, 1949 |

FOREIGN PATENTS

| | | |
|---|---|---|
| 1,076,430 | France | Oct. 26, 1954 |